United States Patent
Demsey et al.

(10) Patent No.: US 7,539,678 B2
(45) Date of Patent: May 26, 2009

(54) SYSTEMS AND METHODS FOR CONTROLLING ACCESS TO AN OBJECT

(75) Inventors: Seth M. Demsey, Kirkland, WA (US); Scott Corbin, Carnation, WA (US)

(73) Assignee: Microsoft Corporation, Redmond, WA (US)

(*) Notice: Subject to any disclaimer, the term of this patent is extended or adjusted under 35 U.S.C. 154(b) by 687 days.

(21) Appl. No.: 10/768,589

(22) Filed: Jan. 30, 2004

(65) Prior Publication Data
US 2005/0198005 A1 Sep. 8, 2005

(51) Int. Cl.
*G06F 17/30* (2006.01)

(52) U.S. Cl. .................. 707/8; 707/2; 707/9; 707/102; 709/210

(58) Field of Classification Search .................. None
See application file for complete search history.

(56) References Cited

U.S. PATENT DOCUMENTS

| | | | | |
|---|---|---|---|---|
| 5,995,998 A * | 11/1999 | Furlani et al. | ............... | 718/102 |
| 6,098,169 A * | 8/2000 | Ranganathan | ............... | 712/227 |
| 6,119,115 A * | 9/2000 | Barr | ............................. | 707/8 |
| 6,298,370 B1* | 10/2001 | Tang et al. | .................. | 718/102 |
| 7,191,272 B2* | 3/2007 | McKenney | .................. | 710/200 |
| 7,225,438 B2* | 5/2007 | Hostetter et al. | ............ | 717/148 |
| 2001/0014905 A1* | 8/2001 | Onodera | ..................... | 709/102 |
| 2002/0178208 A1* | 11/2002 | Hutchison et al. | ........... | 709/102 |

* cited by examiner

*Primary Examiner*—Cam Y T Truong
*Assistant Examiner*—Shyue Jiunn Hwa
(74) *Attorney, Agent, or Firm*—Lee & Hayes, PLLC (57) ABSTRACT

The systems and methods described herein are directed at controlling access to a data structure. A data field is included within the data structure. The data field includes information about the accessibility of the data structure. In response to an attempt to access the data structure by a first thread, the data field is configured to identify that the data structure is not accessible by another thread. The first thread can then access the data structure. In response to an attempt to access the data structure by a second thread, the second thread is configured to determine from the data field that the data structure is being accessed by the first thread.

13 Claims, 9 Drawing Sheets

SYSTEMS AND METHODS FOR CONTROLLING ACCESS TO AN OBJECT

TECHNICAL FIELD

This invention relates to object management in computer systems.

BACKGROUND OF THE INVENTION

As computers become more advanced, software developers are increasingly creating applications that are capable of simultaneously performing multiple tasks. These multi-threaded applications are typically more powerful than conventional applications. In developing multi-threaded applications, software developers often have to implement features to resolve problems that are unique to a multi-threaded operating environment. For example, software developers of multi-threaded applications must implement some locking techniques to ensure that an object is safely shared across multiple threads of execution. Conventional locking techniques typically rely on the operating system to manage the sharing of objects. However, these conventional locking techniques require a large amount of system overhead just to support the sharing of objects. Thus, there is a need for an object locking mechanism that provides a reliable environment for multi-threaded applications while reducing the necessary system overhead.

SUMMARY OF THE INVENTION

The systems and methods described herein are directed at controlling access to a data structure. In one aspect, a data field is included within the data structure. The data field includes information about the accessibility of the data structure. In response to an attempt to access the data structure by a first thread, the data field is configured to identify that the data structure is not accessible by another thread. The first thread can then access the data structure.

In another aspect, in response to an attempt to access the data structure by a second thread, the second thread is configured to determine from the data field that the data structure is being accessed by the first thread.

DETAILED DESCRIPTION

An object locking mechanism is an important component of a multi-threaded operating environment. Studies have been conducted to observe the operational behavior of conventional object locking mechanisms. Some of these studies have found that 1) most locks are taken on unlocked objects; 2) deeply recursive locks are rare; and 3) locks are normally held for short periods. Given these observations, conventional object locking mechanisms often execute more locking steps than actually required, leading to significant performance penalties that are not necessary. The systems and methods described herein take these observations into account and implement an object locking mechanism that includes at least one simplified level, which is referred herein as a primary lock. For example, the primary lock may include an efficient scheme that enables a thread to quickly gain access to an object when no other thread is competing for access. Another level, referred herein as a secondary lock, may include a more sophisticated scheme that resolves contentions among two or more competing threads.

Figure 1:
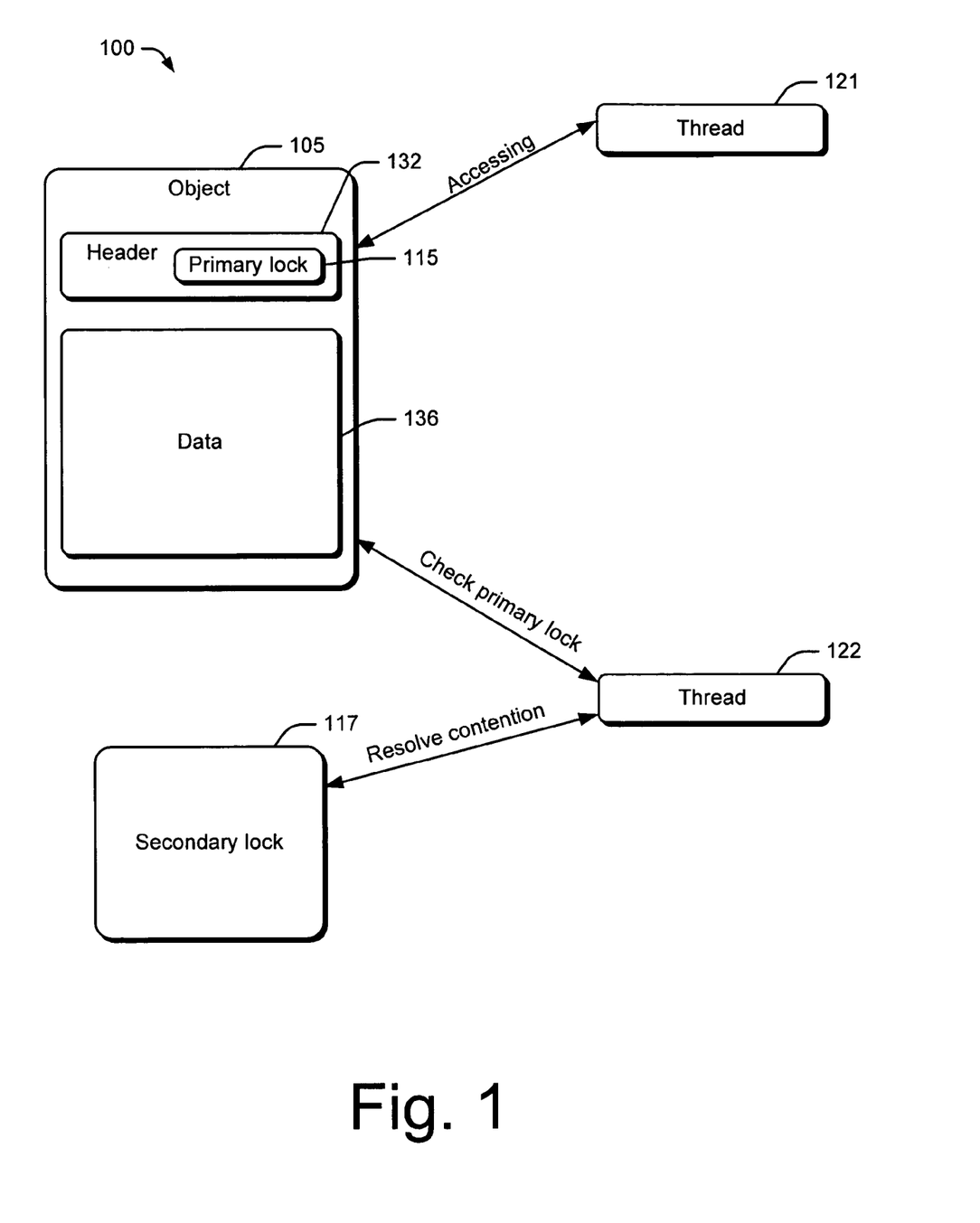
FIG. 1 is a schematic diagram showing an example two-level object locking mechanism.

FIG. 1 is a schematic diagram showing an example two-level object locking mechanism 100. An object 105 is being managed in a multi-threaded computing environment. For illustrative purposes, FIG. 1 shows that a thread 122 is attempting to gain access to object 105 while another thread 121 has current access to object 105. Two level object locking mechanism 100 may be implemented in any type of multi-threaded computing environment. For example, in FIG. 1, threads 121-122 and object 105 may persist in the same computer device or separate computer devices that communicate through a network.

Each of threads 121-122 is a part of a computer-executable component, such as an application, operating system and the like. The execution of threads 121-122 involves object 105. Threads 121-122 may be associated with a single computer-executable component or two separate components.

Object 105 is a data structure that is usable by computer-executable components through threads of execution, such as threads 121-122. Object 105 typically includes a header 132 and data 136. Data 136 may also include procedures for manipulating the data. Header 132 includes metadata about object 105. The metadata may include information on various parameters associated with object 105, such as ownership, size, location, permission, security, dates, and the like.

Primary lock 115 is the first level of two-level locking mechanism 100 and is implemented within object 105. A thread that "owns" primary lock 115 can prevent other threads from gaining access to object 105. As shown in FIG. 1, primary lock 115 may be implemented in header 132 of object 105. In particular, primary lock 115 may be implemented as a data field in object 105 and typically includes one or more states that are related to the accessibility of object 105. The states enable a thread to quickly determine information related to the accessibility of object 105 in a multi-threaded environment. Primary lock 115 may include any information that is relevant to accessibility. For example, primary lock 115 may include a flag that signals whether object 105 is currently being accessed by a thread.

Primary lock 115 may be implemented with only a few bits in header 132, which are small enough in size to enable a thread to quickly determine the state of primary lock 115. A primary lock of one to ten bits may be used to allow a significant amount of accessibility information to be stored. For example, a four-bit primary lock can be configured as any one of sixteen different states represented by Table 1 shown below:

TABLE 1

Example states of a four-bit primary lock.

| Bit | State |
|---|---|
| 0000 | Primary lock is available. |
| 0001-1110 | Lock is owned by thread number 1-14. |
| 1111 | Object is in contention. |

As shown in Table 1, a state may be used to represent that the primary lock is available. Having this state enables a thread to quickly determine that object 105 is accessible without further determination, such as querying an operating system that manages object 105. Primary lock 115 may also include a state for representing a thread identifier. Specifically, if object 105 is being accessed by a thread, a particular state of primary lock 115 is used to identify the thread, which owns the primary lock. Primary lock 115 may further include a state for representing that object 105 is in contention. For example, object 105 is in contention when thread 122 attempts to gain access to object 105 while thread 121 is accessing the object. A contention state in primary lock 115 signals to other threads that primary lock 115 is not available and that a secondary lock 117 would have to be acquired in order to gain access to object 105. The contention state also signals to the thread owning the lock that other thread(s) are attempting to gain access to the object. In response, the owning thread may perform special action when it releases primary lock 115.

In one embodiment, primary lock 115 may include a recursion state for representing whether the same thread has acquired primary lock 115 in a recurring manner. The recursion state may be configured to represent any number of recursion counts, depending on how many bits in the data field of primary lock 115 are assigned to it.

Figure 2A:
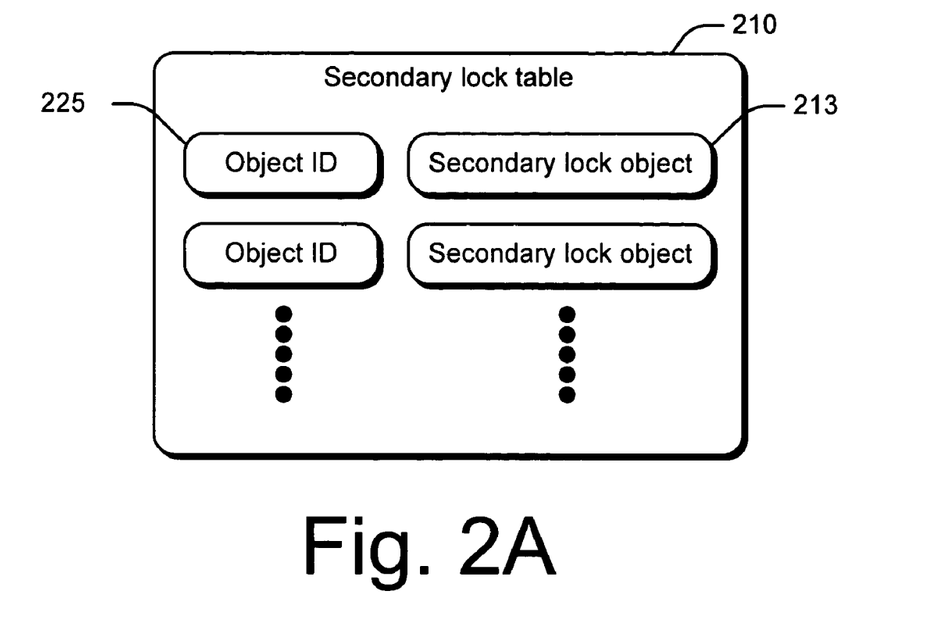
FIGS. 2A-B illustrate example data structures that are associated with the secondary lock shown in FIG. 1.
Figure 2B:
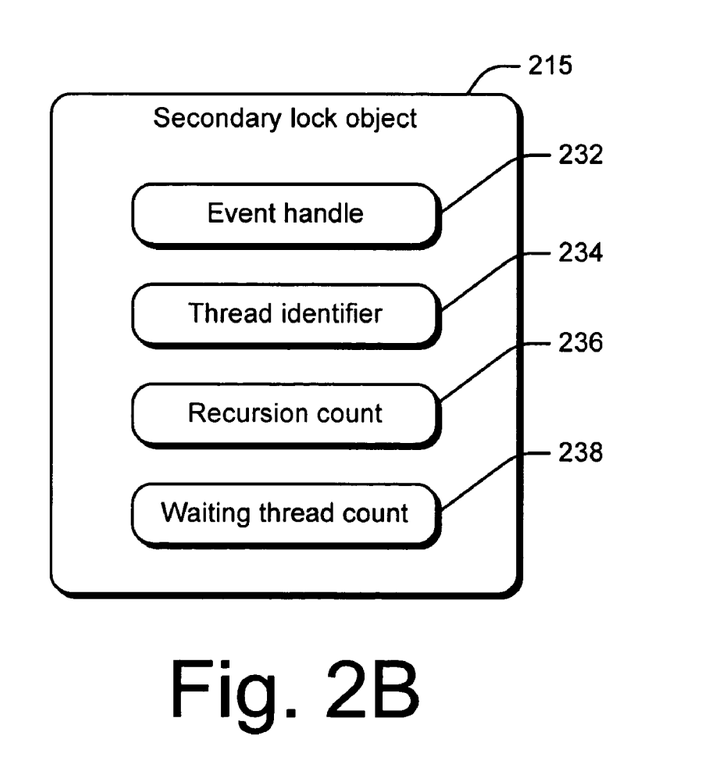

Secondary lock 117 is the second level of two-level locking mechanism 100 and is implemented separately from object 105. Secondary lock 117 typically includes data structures that are managed and maintained by a computer-executable component, such as an operating system. Secondary lock 117 will be discussed in detail in conjunction with FIG. 2. Briefly stated, secondary lock 117 may include data structures independent from object 105 for storing information related to the accessibility of one or more objects.

In operation, two-level object locking mechanism 100 is configured to enable a thread to quickly access an object under certain conditions. For example, when object 105 is not being accessed by any thread, primary lock 115 will include a state of 0000 according to Table 1. If thread 121 attempts to access object 105, thread 121 reads header 115 of object 105 to determine the state of primary lock 115. Thread 121 can immediately own primary lock 115 because of the 0000 state. To access object 105, thread 121 changes the state of primary lock 115 to 0001, which represents that primary lock 115 is owned by thread number 1, which identifies thread 121. Thread 121 may then access object 105. If thread 122 attempts to access object 105, thread 122 will determine that the state of primary lock 115 is 0001. To gain access to object 105, thread 122 would have to resolve the contention by monitoring secondary lock 117. Thread 122 changes the state of primary lock 115 to 1111 to signal to other threads and thread 121 that object 105 is in contention. The operations of two-level object locking mechanism 100 will be discussed in more detail in conjunction with FIG. 3-7.

FIGS. 2A-B illustrate example data structures that are associated with secondary lock 117 shown in FIG. 1. FIG. 2A is a graphical representation of an example secondary lock table 210. Secondary lock table 210 is a data structure associated with secondary lock 117 shown in FIG. 1. Secondary lock table 210 may be maintained by any computer-executable component. Secondary lock table 210 allows secondary lock 117 to be located without incurring space overhead in object 105. Secondary lock table 210 includes information about the accessibility of objects that are managed by the computer-executable component. In particular, the computer-executable component uses secondary lock table 210 to resolve contentions among threads that simultaneously attempt to access a particular object.

As shown in FIG. 2A, secondary lock table 210 includes an indexing data field 225 having object identifiers for identifying objects. An object identifier may include a parameter unique to the object, such as a name, a pointer to a location in memory, and the like. In one embodiment, the object identifier is the hash value of a parameter associated with the object.

Secondary lock table 210 also includes a second data field 213 indexed to the first data field 225. Each entry in the second data field 213 contains a secondary lock object that is indexed to an object identifier in the first data field 225. Each secondary lock object is a data structure that includes information related to the accessibility of an object associated with the corresponding object identifier.

FIG. 2B is a graphical representation of an example secondary lock object 215 in the second data field 213 shown in FIG. 2A. Secondary lock object 215 includes data fields having information related to the accessibility of a particular object. As shown in FIG. 2B, secondary lock object 215 includes an event handle data field 232, a thread identifier data field 234, a recursion count data field 236, and a waiting thread count data field 238.

Event handle data field 232 stores information associated with a handle for obtaining notifications of events. These events are significant to maintaining the secondary lock associated with secondary lock object 215. The information may include a pointer that enables the events to be accessed. In one embodiment, the event handle includes a synchronization object managed by an operating system.

Thread identifier data field 234 stores information for identifying the thread that has possession of a primary lock associated with the secondary lock. Recursion count data field 236 stores a counter that indicates how many times a thread has recursively acquired the primary lock. Waiting thread count data field 238 stores a counter that indicates how many threads are waiting to acquire the primary lock.

Figure 3:
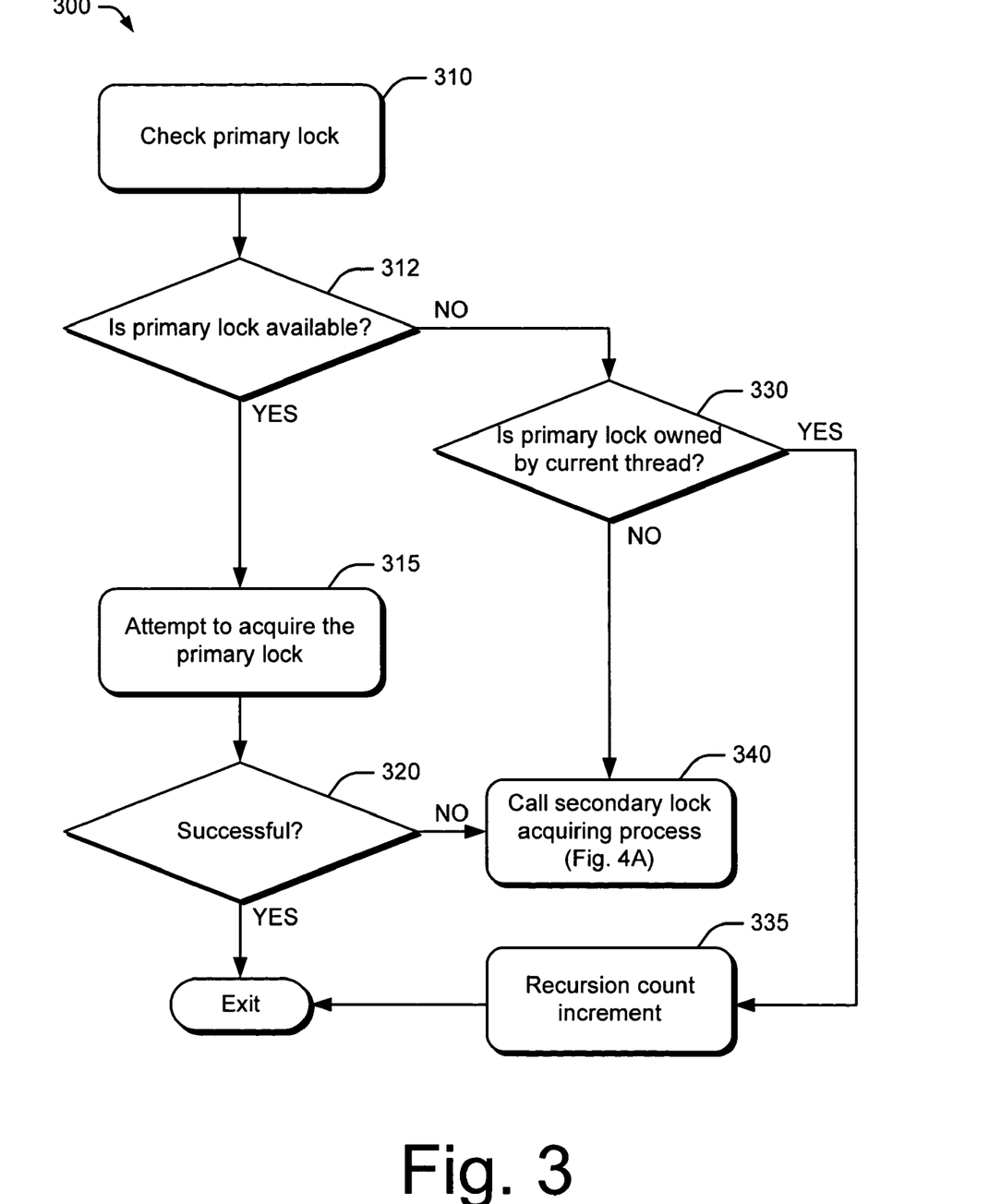
FIG. 3 is a flow diagram of an example process for acquiring a primary lock.

FIG. 3 is a flow diagram of an example process 300 for acquiring a primary lock. Acquiring the primary lock enables a thread to gain access to an object. At block 310, the primary lock associated with the object is checked. At decision block 312, a determination is made whether the primary lock is available. This determination may be made by checking a state in the primary lock that represents whether the primary lock is available. If the primary lock is available, the process continues at block 315 where the current thread will attempt to acquire the primary lock. At decision block 320, a determination is made whether the primary lock is successfully acquired. If so, the thread may gain access to the object and the process exits. If the primary lock is not successfully acquired, process 300 moves to block 340 where a secondary lock acquiring process is called.

Returning to decision block 312, if the primary lock is not available, process 300 moves to decision block 330 where a determination is made whether the primary lock is owned by the current thread. If so, then the current thread is recursively acquiring the primary lock on the object. Process 300 moves to block 335 where a recursion count increment is performed and the process exits. If the primary lock is not owned by the current thread, process 300 continues at block 340 where a secondary lock acquiring process is called.

Figure 4A:
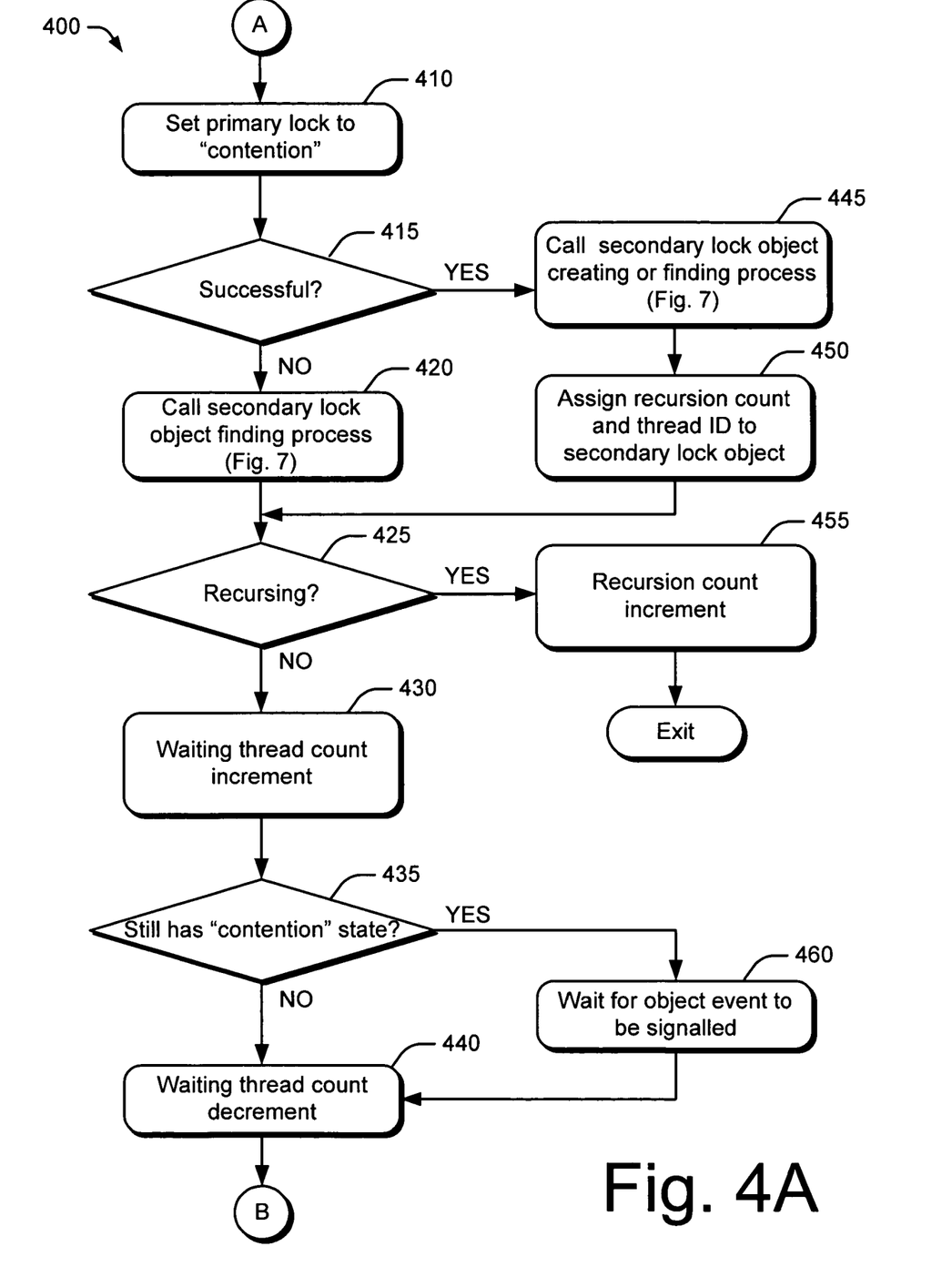
FIGS. 4A and 4B are flow diagrams of an example process for acquiring a secondary lock.
Figure 4B:
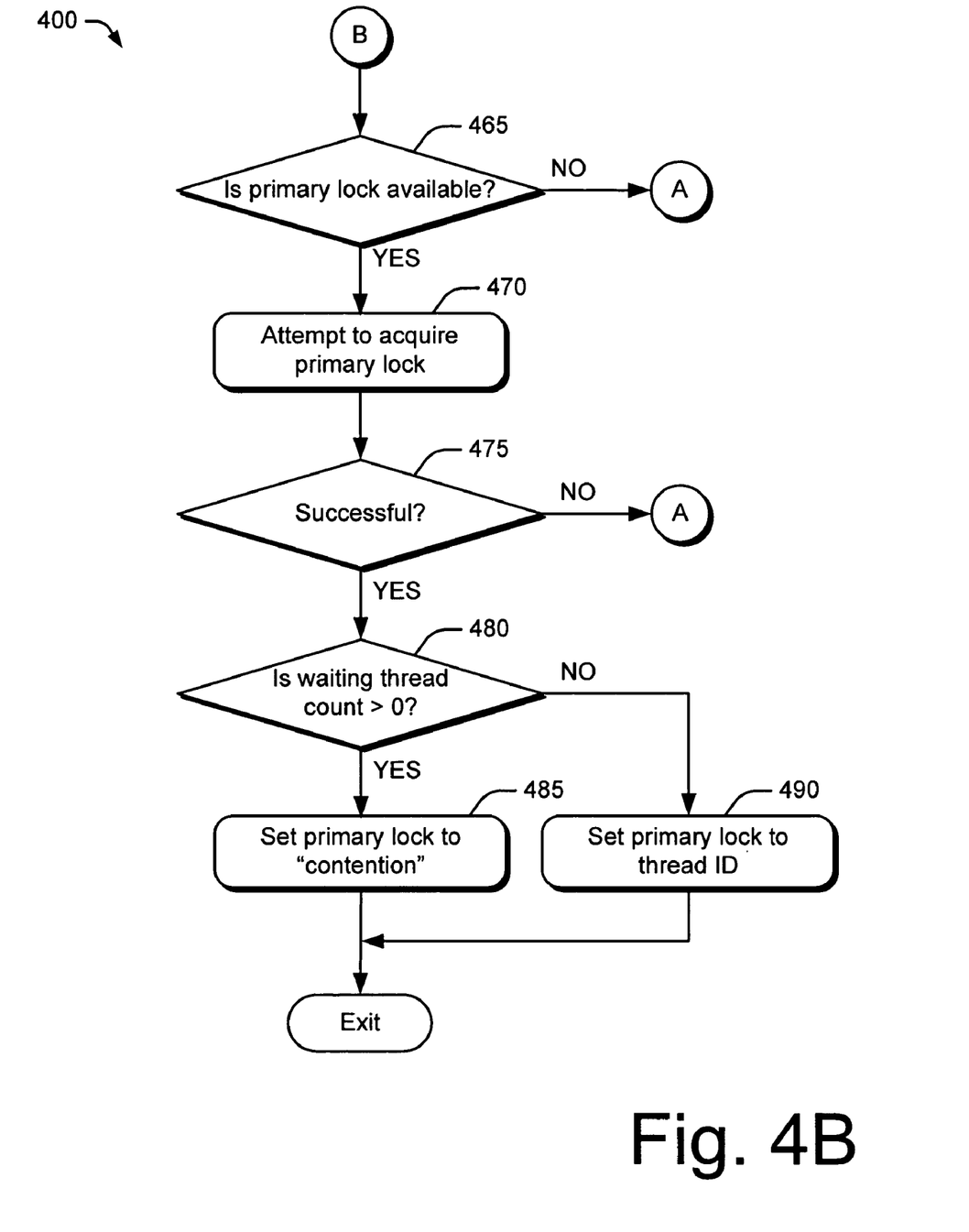

FIGS. 4A and 4B are flow diagrams of an example process 400 for acquiring a secondary lock. Acquiring the secondary lock enables a competing thread to gain access to an object where the primary lock of the object is owned by a current thread. At block 410, the competing thread sets the primary lock to a "contention" state.

At decision block 415, a determination is made whether the primary lock was successfully set to a "contention" state. If so, process 400 moves to block 445 where the secondary lock object is acquired by calling a creating or finding process. At block 450, the recursion count and the thread identifier from the primary lock is assigned to the secondary object. The recursion count is the number of times that the current thread that owns the primary lock has recursively acquired the primary lock. The thread identifier identifies the current thread. Process 400 then moves to decision block 425.

Returning to decision block 415, if the primary lock cannot be successfully set, then a third thread has attempted or is attempting to access the object before the competing thread. Thus, a secondary lock object has already been created in the prior access attempt. At block 420, the secondary lock object is acquired by calling a finding process, which does not attempt to create the object.

At decision block 425, a determination is made whether the competing thread is performing recursion on the secondary lock object. If so, process 400 moves to block 455 where the recursive count increment is performed on the secondary lock object and the process exits.

Returning to decision block 425, if the competing thread is not performing recursion on the secondary lock object, process 400 goes to block 430 where a waiting thread count increment is performed on the secondary lock object. Many threads may be waiting to gain access to the object in addition to the competing thread. The waiting thread count accounts for these waiting threads.

At decision block 435, a determination is made whether the primary lock still has a "contention" state. If so, process 400 moves to block 460 where the competing thread waits for an object event to be signaled, which indicates a change in the primary lock.

Returning to decision block 435, if the primary lock no longer has a "contention" state, process 400 goes to block 440 where a waiting thread count decrement is performed on the secondary lock object. As indicated by reference A, process 400 continues to decision block 465 (FIG. 4B) where a determination is made whether the primary lock is available. If the primary lock is not available, process 400 moves back to block 410 (FIG. 4A), as indicated by reference A.

Returning to decision block 465, if the primary lock is available, process 400 goes to block 470 where the competing thread attempts to acquire the primary lock. At decision block 475, a determination is made whether the competing thread has successfully acquired the primary lock. If not, then another thread ahead of the competing thread is likely trying to obtain the primary lock. Process 400 moves back to block 410 (FIG. 4A) as indicated by reference A.

Returning to decision block 475, if the primary lock is successfully acquired, then it is the competing thread's turn to access the object. However, other threads may be waiting behind the competing thread. At decision block 480, a determination is made whether the waiting thread count is greater than zero. If so, other threads are waiting behind the competing thread to access the object. Process 400 moves to block 485 where the primary lock is set to a "contention" state.

Returning to decision block 480, if the waiting thread count is zero, process 400 moves to block 490 where the primary lock is set to a thread identifier that identifies the competing thread.

Figure 5:
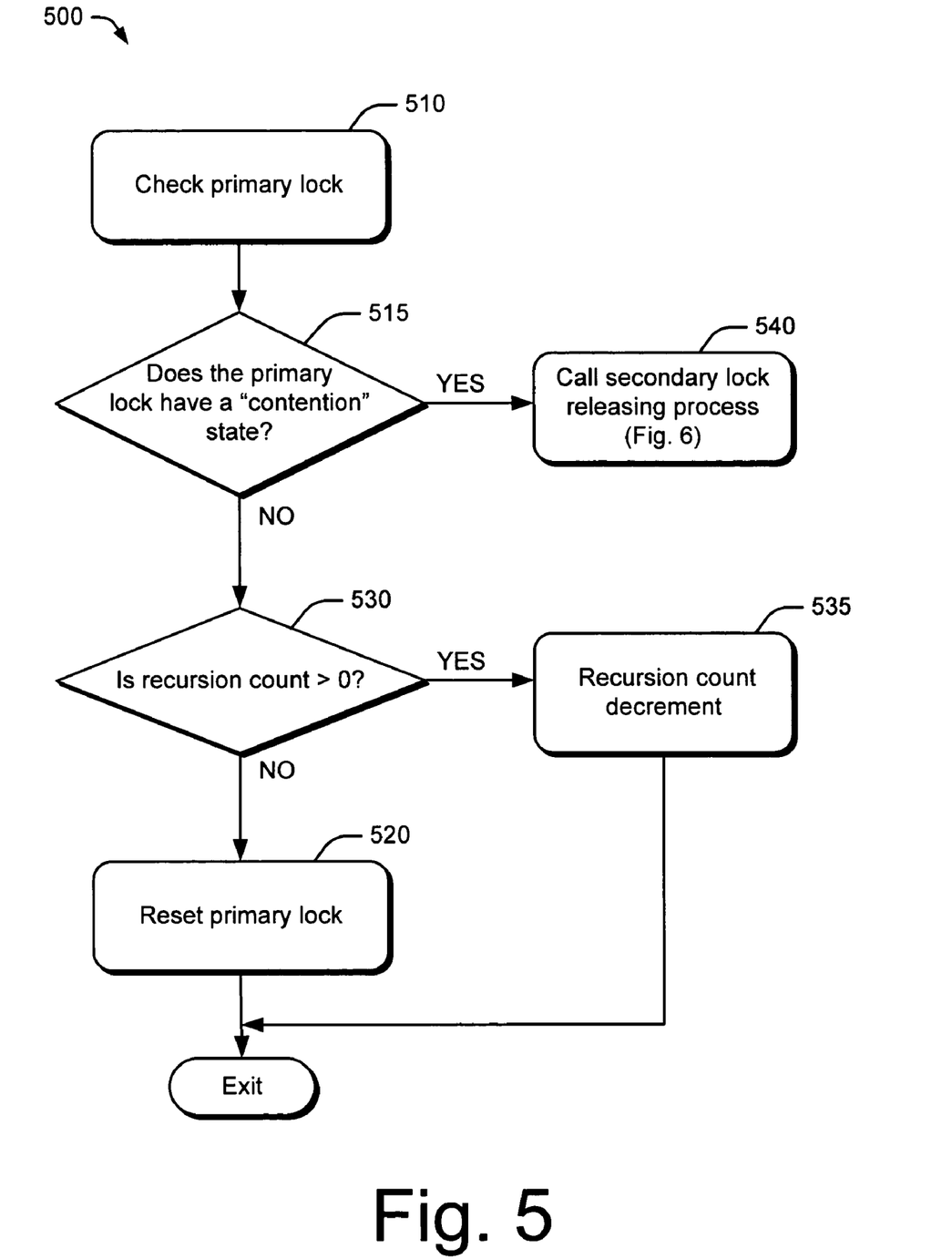
FIG. 5 is a flow diagram of an example process for a thread to release a primary lock associated with an object.

FIG. 5 is a flow diagram of an example process 500 for a thread to release a primary lock associated with an object. At block 510, the primary lock is checked. At decision block 515, a determination is made whether the primary lock has a "contention" state. If so, process 500 moves to block 540 where a secondary lock releasing process is called.

Returning to decision block 515, if the primary lock does not have a "contention" state, process 500 continues at decision block 530 where a determination is made whether the recursion count of the primary lock is greater than zero. If so, the thread is recursively acquiring the primary lock. At block 535, a recursion count decrement is performed and the process exits.

Returning to block 530, if the recursion count is zero, the current thread is not recursively acquiring the primary lock. Process 500 continues to block 520 where the primary lock is reset. For example, the primary lock may be changed to a state that indicates it is available. The process of resetting the primary lock is atomically performed such that the primary lock is completely released before other operations are performed on the lock.

Figure 6:
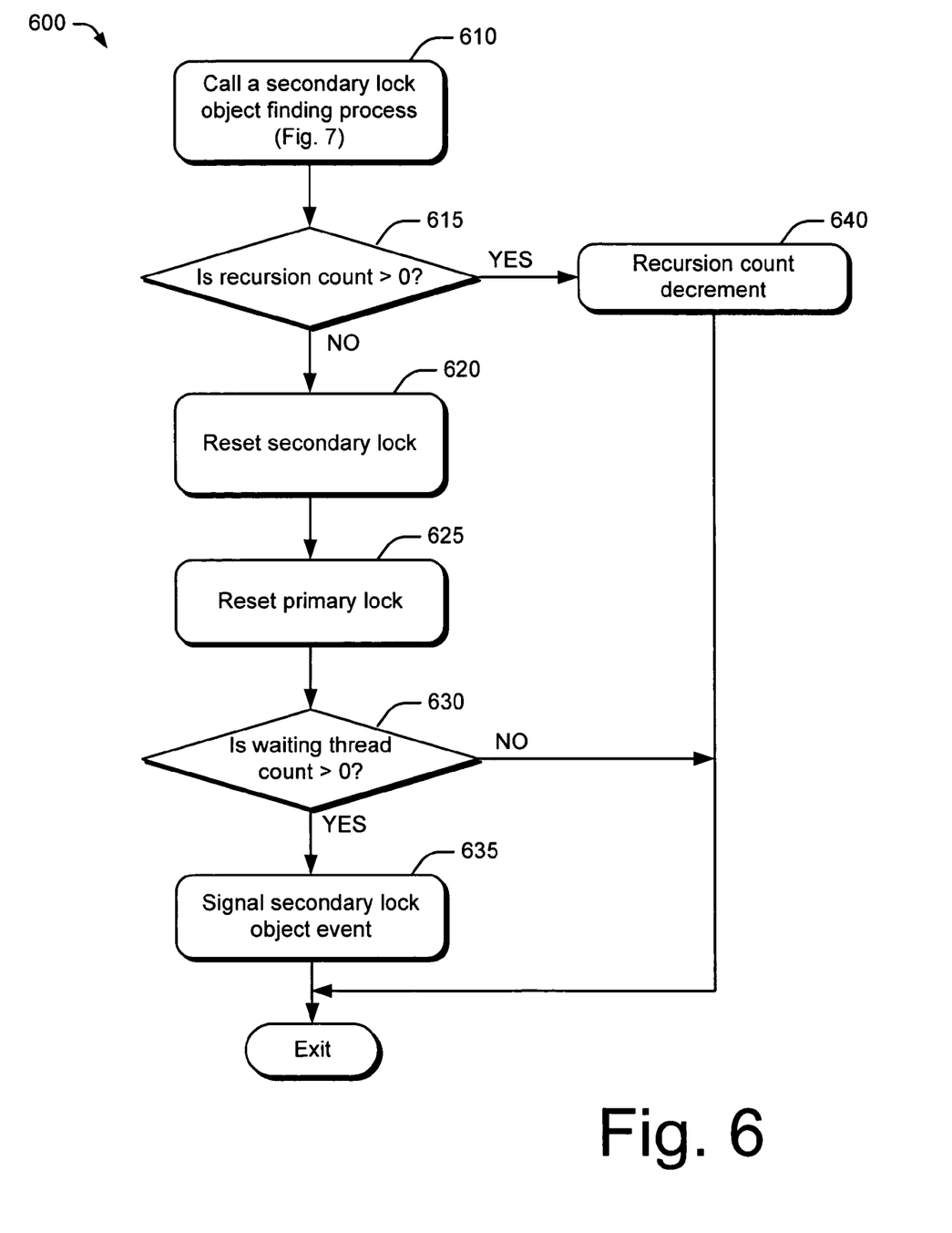
FIG. 6 is a flow diagram of an example process for a thread to release a secondary lock associated with an object.

FIG. 6 is a flow diagram of an example process 600 for a thread to release a secondary lock associated with an object. At block 610, the secondary lock object is found by calling a finding process. At decision block 615, a determination is made whether the recursion count in the secondary lock object is greater than zero. If so, the thread has recursively acquired the object. Process 600 moves to block 640 where a recursion count decrement is performed and the process exits.

Returning to decision block 615, if the recursion count in the secondary lock object is zero, process 600 moves to block 620 where the secondary lock is reset. The secondary lock may be reset by setting the thread identifier in the secondary lock object to zero. At block 625, the primary lock is reset, which may be done by setting the primary lock to a state that indicates availability. At decision block 630, a determination is made whether the waiting thread count is greater than 0. If not, process 600 exits. If the waiting thread count is greater than 0, another thread is waiting to acquire the secondary lock. Process 600 moves to block 635 where a secondary lock object event is signaled for the waiting thread and the process exits.

Figure 7:
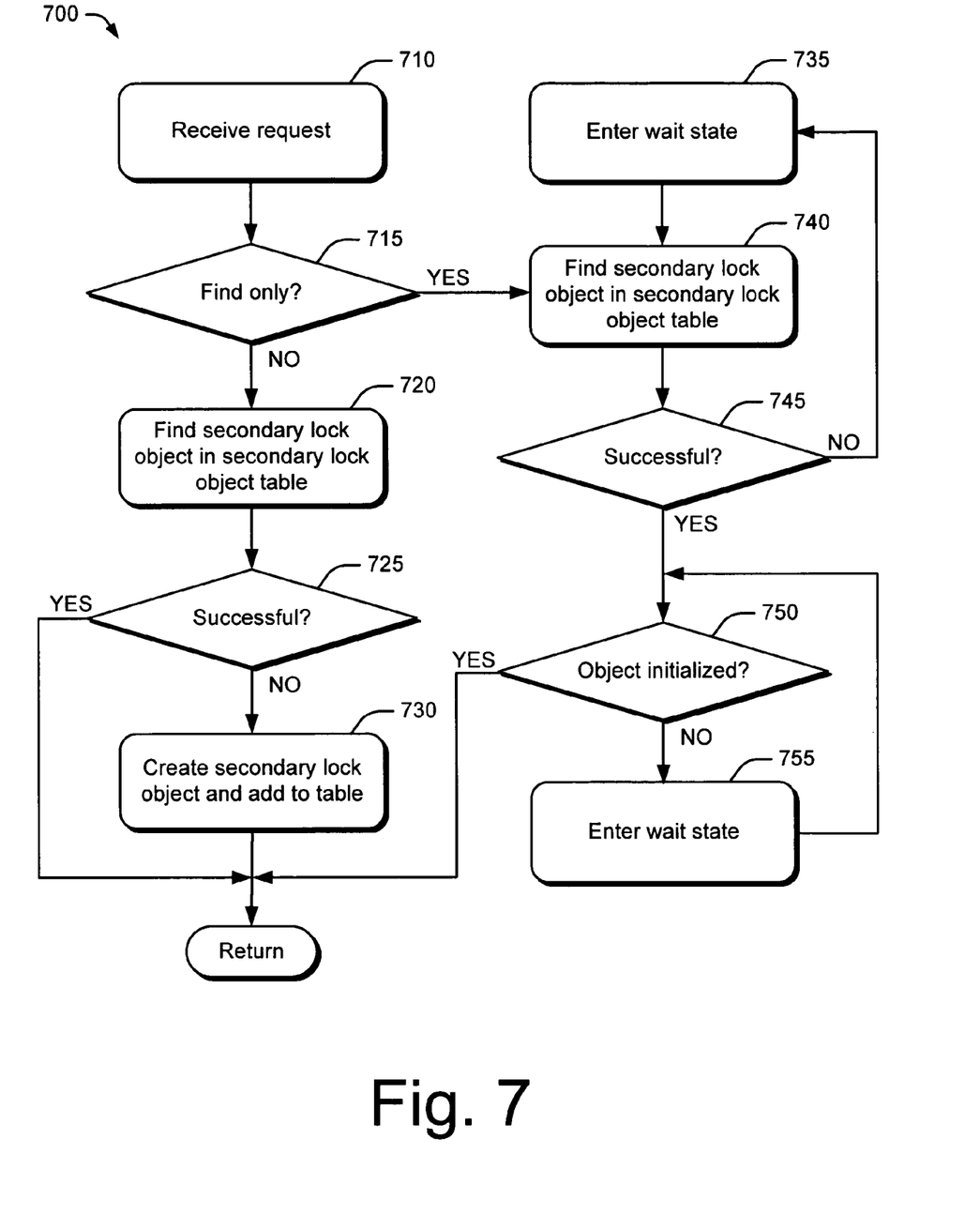
FIG. 7 is a flow diagram of an example process for creating or finding a secondary lock object.

FIG. 7 is a flow diagram of an example process 700 for creating or finding a secondary lock object. At block 710, a request associated with a secondary lock object is received. At decision block 715, a determination is made whether the request includes find-only instructions. If so, process 700 moves to block 740 where an attempt is made to find the secondary lock object in a secondary lock table. At decision block 745, a determination is made whether the secondary lock object has been successfully found. If not, the secondary lock object is likely in the process of being created or modified. At block 735, process 700 enters a wait state, which may allow other threads to execute. After the wait state, process 700 returns to block 740 where another attempt is made to find the secondary lock object.

Returning to decision block 745, if the secondary lock object has been successfully found, process 700 moves to decision block 750 where a determination is made whether the secondary lock object has been initialized. If so, the secondary lock object is returned. If the secondary lock object has not been initialized, the secondary lock object is likely in the process of being created. At block 755, process 700 enters a wait state and returns to decision block 750.

Returning to decision block 715, if the request does not include find-only instructions, process 700 moves to block 720 where an attempt is made to find the secondary lock object in the secondary lock object table. At decision block 725, a determination is made whether the secondary lock object has been successfully found. If so, the secondary lock object is returned. If the secondary lock object cannot be found, process 700 moves to block 730 where the secondary lock object is created, initialized and added to the secondary lock object table. The process then returns the secondary lock object.

Figure 8:
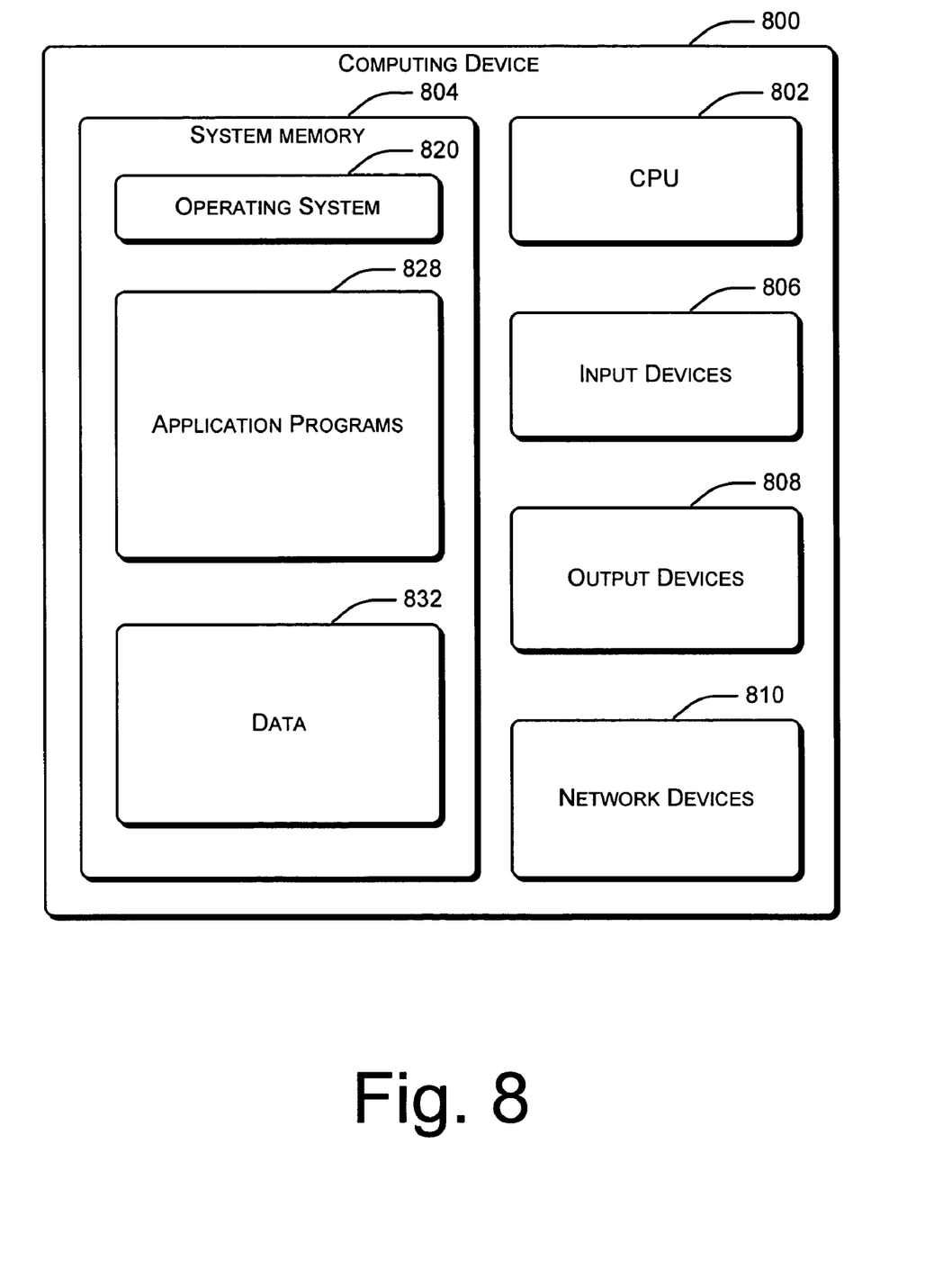
FIG. 8 illustrates an example computing device within which the described systems and methods can be either fully or partially implemented.

FIG. 8 illustrates an example computing device 800 within which the described systems and methods can be either fully or partially implemented. Computing device 800 is only one example of a computing system and is not intended to suggest any limitation as to the scope of the use or functionality of the invention.

Computing device 800 can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, gaming consoles, distributed computing environments that include any of the above systems or devices, and the like.

The components of computing device 800 can include, but are not limited to, processor 802 (e.g., any of microprocessors, controllers, and the like), system memory 804, input devices 806, output devices 808, and network devices 810.

Computing device 800 typically includes a variety of computer-readable media. Such media can be any available media that is accessible by computing device 800 and includes both volatile and non-volatile media, removable and non-removable media. System memory 804 includes computer-readable media in the form of volatile memory, such as random access memory (RAM), and/or non-volatile memory, such as read only memory (ROM). A basic input/output system (BIOS), containing the basic routines that help to transfer information between elements within computing device 800, such as during start-up, is stored in system memory 804. System memory 804 typically contains data and/or program modules that are immediately accessible to and/or presently operated on by processor 802.

System memory 804 can also include other removable/non-removable, volatile/non-volatile computer storage media such as CD-ROM, DVD. Computer-readable storage media includes removable/non-removable, volatile/non-volatile computer storage media. By way of example, a hard disk drive may be included for reading from and writing to a non-removable, non-volatile magnetic media; a magnetic disk drive may be included for reading from and writing to a removable, non-volatile magnetic disk (e.g., a "floppy disk"); and an optical disk drive may be included for reading from and/or writing to a removable, non-volatile optical disk such as a CD-ROM, DVD, or any other type of optical media.

The disk drives and their associated computer-readable media provide non-volatile storage of computer-readable instructions, data structures, program modules, and other data for computing device 800. It is to be appreciated that other types of computer-readable media which can store data that is accessible by computing device 800, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement exemplary computing device 800. Any number of program modules can be stored in system memory 804, including by way of example, an operating system 820, application programs 828, and data 832.

Computing device 800 can include a variety of computer-readable media identified as communication media. Communication media typically embodies computer-readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

A user can enter commands and information into computing device 800 via input devices 806 such as a keyboard and a pointing device (e.g., a "mouse"). Other input devices 806 may include a microphone, joystick, game pad, controller, satellite dish, serial port, scanner, touch screen, touch pads, key pads, and/or the like. Output devices 808 may include a CRT monitor, LCD screen, speakers, printers, and the like.

Computing device 800 may include network devices 810 for connecting to computer networks, such as local area network (LAN), wide area network (WAN), and the like.

Below are example pseudo codes that may be used to implement the described systems and methods.

Monitor.Enter( ):

If BitLock is unowned
    Atomically take ownership
Else if BitLock is owned by current thread and BitLock recursion count is less than it's maximum value
    Increment BitLock recursion count
Else
    Call SecondaryLock( )
Monitor.Exit( ):

If BitLock is contested
    Call SecondaryUnlock( )
Else if BitLock recursion count is greater than 0
    Decrement BitLock recursion count
Else
    Atomically release ownership
SecondaryLock( ):

Start:
Atomically set BitLock to contested state
If success    // we set the contested state
    GetSyncObject(FindOrCreate)
    Copy recursion count from BitLock to SyncObject
    Set tid in SyncObject to current owner tid
Else    // we lost a race to set the contested state, or it's not contested
    GetSyncObject(Find)
If recursing
    Increment recursion count in SyncObject
    Return -continued

```
// Note: BitLock is checked after incrementing thread count
Atomically increment count of waiting threads
If BitLock == contested state
    Wait for SyncObject Event to be signaled
Atomically decrement count of waiting threads
// Note: BitLock is acquired before checking thread count
If (BitLock == unowned)
    Atomically take BitLock (i.e. acquire ownership)
    If success
        If count of waiting threads > 0
            Atomically set BitLock to contested state
            If success
                Set current tid in SyncObject
        Return
Goto Start
SecondaryUnlock( ):

GetSyncObject(Find)
ASSERT SyncObject tid == current tid
If recursion count > 0
            Decrement recursion count
Else        // lock is being released
            Set tid in SyncObject to 0
            Set BitLock to 0
            If count of waiting threads > 0
                Signal SyncObject Event
GetSyncObject(FindOrCreateAction):

If FindOrCreateAction == FindOrCreate
    Lookup SyncObject in hash table
    If not found
        Create and initialize SyncObject; Add to hash table
    Else
        ASSERT SyncObject TID == 0
Else // FindOrCreateAction == Find
    // Synchronize with the thread creating the SyncObject
    Loop
        Lookup SyncObject in hash table
        If found
            Break
        Else
            Sleep(0)        // allows other threads to run
    End loop
// Synchronize with the thread initializing the tid field. This is
// necessary because "SyncObject tid == 0 &&BitLock ==
//contested" is
// a transient invalid state, and will cause recursion checks to fail
// as well as create additional race conditions that lead to a corrupt
// tid state (e.g. the owning thread may try to release the lock before
// the SyncObject tid is initialized).
//
// Note that this synchronization is necessary only for the thread that
// owns the lock, for two reasons: 1) the tid field is used for (and
//only
// for) the recursion check, and 2) the lock owner (and only the lock
// owner) can set the tid to 0, and a race between that thread and the
// thread that is trying to set the tid must be prevented.
    Loop
        If SyncObject tid == 0 AND BitLock == contested
            Sleep(0)
        Else
            Break
    End loop
Return SyncObject
```

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method of controlling access to a first data structure, the method comprising:
providing a data field within a header of the first data structure stored in a computer memory, the data field containing information about the accessibility of the first data structure, the data field representing a primary lock, wherein the primary lock is configured to indicate a single state of a plurality of states at a given time by changing a plurality of bits used to quickly determine the state of the primary lock, the plurality of states comprising:
  a state representing the availability of the primary lock;
  a state representing each of a plurality of thread identifiers in an event a thread has accessed the first data structure; and
  a state representing the first data structure is in contention;
in response to a first thread accessing the first data structure, changing the information about the accessibility of the first data structure in the data field to indicate that the first data structure is not accessible by indicating the identification of the first thread; and in response to an attempt to access the first data structure by a second competing thread while the first thread is accessing the first data structure:
  determining that the first data structure is inaccessible based on the indication identifying the first thread:
  changing the information about the accessibility of the first data structure in the data field to indicate that the first data structure is in a state of contention;
  indicating to the second competing thread that a secondary lock must be acquired in order to gain access to the first data structure, wherein the secondary lock:
    is associated with a plurality of shared objects; and
    stores additional information compared to the primary lock;
  creating, by using a computer, a second data structure associated with the secondary lock, the second data structure being separate from the first data structure, wherein the second data structure includes information about the accessibility of the first data structure; and
  associating the second data structure with the first data structure;
    wherein the information included in the second data structure comprises:
      an event handle data field that stores information associated with a handle for obtaining notifications of events significant to maintaining the secondary lock associated with the first data structure;
      a thread identifier data field that stores information for identifying the thread that has possession of the primary lock associated with the secondary lock;:
a recursion count data field that stores a counter that indicates how many times competing threads have recursively acquired the primary lock: and
a waiting count data field that indicates how many competing threads are waiting to acquire the primary lock once the first thread no longer owns the primary lock.

2. The method as recited in claim 1, further comprising:
in response to an attempt to access the first data structure by a third competing thread,
determining from the data field that the first data structure is in contention; and
monitoring the first data structure to determine when the data structure will become accessible.

3. One or more computer-readable storage media containing instructions that are executable by a processor to perform the method recited in claim 1.

4. The method as recited in claim 1, wherein the plurality of bits consists of four bits, wherein the four bits are set to represent:
   a first state indicating the primary lock is available;
   second through fifteenth different states each identifying one of fourteen threads accessing the first data structure; and
   a sixteenth state indicating the first data structure is in a state of contention.

5. A system comprising:
   a memory configured to store an object encoded with a primary lock, wherein the primary lock:
      is included in a header within the object;
      comprises a plurality of bits;
      only allows one thread to access the object at any given time; and
      is configured to utilize all the plurality of bits to indicate a single state of a plurality of states at a given time by setting the plurality of bits to quickly determine the state of the primary lock, the plurality of states comprising:
         a state representing the availability of the primary lock;
         a state representing each of a plurality of thread identifiers in an event a thread has accessed the object; and
         a state representing the object is in contention;
   a processor configured to execute a first thread associated with an application, wherein the first thread is configured to determine the availability of the primary lock and to determine whether the object is accessible based, at least in part, on one of the plurality of states;
   wherein:
      in response to the first thread accessing the object, the availability of the primary lock is set to represent that the object is not accessible by indicating the identification of the first thread; and
      in response to an attempt to access the object by a second thread:
         determining that the object is inaccessible based on the availability of the primary lock indicating the identification of the first thread;
         setting the state that represents the object is in contention to indicate that the object is in contention;
         indicating to the second thread that a secondary lock must be acquired in order to gain future access to the object, wherein the secondary lock is associated with a plurality of shared objects;
         creating a data structure associated with the secondary lock, wherein the data structure includes information about the accessibility of the object; and
         associating the data structure with the object;
         wherein the information included in the data structure comprises:
            an event handle data field that stores information associated with a handle for obtaining notifications of events significant to maintaining the secondary lock associated with the object;
            a thread identifier data field that stores information for identifying the thread that has possession of the primary lock associated with the secondary lock;
            a recursion count data field that stores a counter that indicates how many times each of a plurality of competing threads has recursively acquired the primary lock; and
            a waiting count data field that indicates how many competing threads are waiting to acquire the primary lock once the first thread no longer owns the primary lock.

6. The system as recited in claim 5, wherein the plurality of bits consists of four bits, wherein the four bits are set to represent:
   a first state indicating the primary lock is available;
      second through fifteenth different states each identifying one of fourteen threads accessing the object; and
      a sixteenth state indicating the object is in a state of contention.

7. One or more computer-readable storage media storing computer-executable instructions that, when executed by one or more processors, configure a computing system to perform acts comprising:
   providing a data field within a header of a first data structure stored in a computer memory, the data field containing information about the accessibility of the first data structure, the data field representing a primary lock, wherein the primary lock is configured to indicate a single state of a plurality of states at a given time by changing a plurality of bits used to quickly determine the state of the primary lock, the plurality of state comprising:
      a state representing the availability of the primary lock;
      a state representing each of a plurality of thread identifiers in an event a thread has accessed the first data structure; and
      a state representing the first data structure is in contention;
   in response to a first thread accessing the first data structure, changing the information about the accessibility of the first data structure in the data field to indicate that the first data structure is not accessible by indicating the identification of the first thread; and
   in response to an attempt to access the first data structure by a second competing thread while the first thread is accessing the first data structure:
      determining that the first data structure is inaccessible based on the indication identifying the first thread;
      changing the information about the accessibility of the first data structure in the data field to indicate that the first data structure is in a state of contention;
      indicating to the second competing thread that a secondary lock must be acquired in order to gain access to the first data structure, wherein the secondary lock:
         is associated with a plurality of shared objects; and
         stores additional information compared to the primary lock;
      creating a second data structure associated with the secondary lock, the second data structure being separate from the first data structure, wherein the second data structure includes information about the accessibility of the first data structure; and
      associating the second data structure with the first data structure;
         wherein the information included in the second data structure comprises:
            an event handle data field that stores information associated with a handle for obtaining notifications of events significant to maintaining the secondary lock associated with the first data structure;

a thread identifier data field that stores information for identifying the thread that has possession of the primary lock associated with the secondary lock;

a recursion count data field that stores a counter that indicates how many times competing threads have recursively acquired the primary lock; and a waiting count data field that indicates how many competing threads are waiting to acquire the primary lock once the first thread no longer owns the primary lock.

8. A computer-readable storage medium as recited in claim 7, wherein the information in the second data structure is used for resolving contention of the object between two threads.

9. The computer-readable storage medium as recited in claim 7, wherein the plurality of bits consists of four bits, wherein the four bits are set to represent:

a first state indicating the primary lock is available;

second through fifteenth different states each identifying one of fourteen thread accessing the first data structure; and a sixteenth state indicating the first data structure is in a state of contention.

10. An apparatus comprising:

means for storing computer-executable instructions in one or more storage devices;

means for processing the computer-executable instructions stored on the one or more storage devices;

means for providing a data field within a header of a first data structure stored in a computer memory, the data field containing information about the accessibility of the first data structure, the data field representing a primary lock, wherein the primary lock is configured to indicate a single state of a plurality of states at a given time by changing a plurality of bits used to quickly determine the state of the primary lock, the plurality of states comprising:

a state representing the availability of the primary lock;

a state representing each of a plurality of thread identifiers in an event a thread has accessed the first data structure; and a state representing the first data structure is in contention;

in response to a first thread accessing the first data structure, means for changing the information about the accessibility of the first data structure in the data field to indicate that the first data structure is not accessible by indicating the identification of the first thread; and in response to an attempt to access the first data structure by a second competing thread while the first thread is accessing the first data structure:

means for determining that the first data structure is inaccessible based on the indication identifying the first thread;

means for changing the information about the accessibility of the first data structure in the data field to indicate that the first data structure is in a state of contention;

means for indicating to the second competing thread that a secondary lock must be acquired in order to gain access to the first data structure, wherein the secondary lock:

is associated with a plurality of shared objects; and stores additional information compared to the primary lock;

means for creating a second data structure associated with the secondary lock, the second data structure being separate from the first data structure, wherein the second data structure includes information about the accessibility of the first data structure; and means for associating the second data structure with the first data structure;

wherein the information included in the second data structure comprises:

an event handle data field that stores information associated with a handle for obtaining notifications of events significant to maintaining the secondary lock associated with the first data structure;

a thread identifier data field that stores information for identifying the thread that has possession of the primary lock associated with the secondary lock;

a recursion count data field that stores a counter that indicates how many times competing threads have recursively acquired the primary lock; and a waiting count data field that indicates how many competing threads are waiting to acquire the primary lock once the first thread no longer owns the primary lock 11. The apparatus as recited in claim 10, further comprising means for determining from the primary lock that the data structure is being accessed by the first thread without accessing another data structure.

12. The apparatus as recited in claim 10, further comprising means for releasing the primary lock to enable other threads to access the data structure.

13. The apparatus recited in claim 10, wherein the plurality of bits consists of four bits, wherein the four bits are set to represent:

a first state indicating the primary lock is available;

second through fourteenth different states each identifying one of fourteen threads accessing the date structure; and a sixteenth state indicating the data structure is in a state of contention.

* * * * *